3,449,544
CONTROLLED ARC WELDING
James C. Needham, Abington Hall, Cambridge, England, assignor to The Welding Institute, London, England
Filed Mar. 27, 1967, Ser. No. 626,279
Claims priority, application Great Britain, Mar. 29, 1966, 13,904/66
Int. Cl. B23k 9/10
U.S. Cl. 219—131     6 Claims

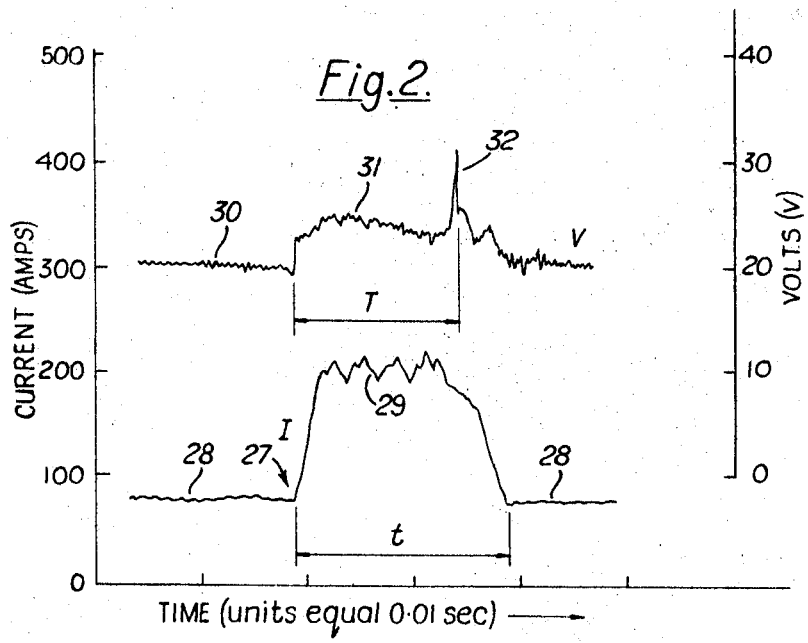
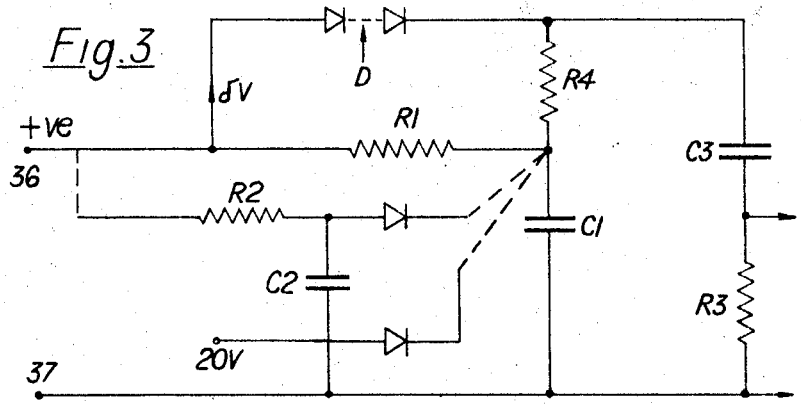

ABSTRACT OF THE DISCLOSURE

A controlled transfer arc welding apparatus which includes in addition to a power supply for providing an arc maintaining current and a means for cyclically enhancing the arc current to provide for recurring current pulses having a level above the minimum value required for spray transfer, a detector for sensing the detachment of a droplet from the controlled electrode and a means actuated by the detector for terminating the current pulse which causes the detachment.

---

This invention relates to consumable electrode welding employing pulsed current sources and more particularly to apparatus for altering the characteristics of the current source to provide improved control of the transfer of electrode material.

Controlled transfer arc welding is known in which the electrode is supplied with current which is raised cyclically at preset intervals from a background level (which is sufficient to melt the electrode tip but not to produce transfer of the electrode in the periods for which it is effective) to a higher level which produces transfer. A convenient source of power for such controlled transfer supplies a D.C. or rectified and partly smoothed A.C. background level superimposed with pulses of half sinusoidal waveform at the frequency of the mains supply.

Explanations of the detachment of the droplets from the consumable electrode and their projection towards the workpiece have been based on the balance of forces between that due to the arc and the gravity force, on the one hand, and the retainment forces due to surface tension on the other hand. The force due to the arc may be due to the "pinch effect" caused by the reaction of the transverse component of current flow with the circular magnetic field surrounding the consumable electrode carryiny the current, which would tend to move the central portion of the droplet away from the end of the electrode on which it is formed.

We believe that although this "static balance" explanation may hold for sub-threshold transfer, that is to say for transfer of large globules which fall infrequently mainly under gravitational forces, the explanation based on a static balance of forces is inadequate to explain detachment above the threshold current value, where true spray transfer is taking place. We believe that in spray transfer the balance of forces to be considered is dynamic in nature and that it is necessary to take into account the force available to accelerate the droplet until its displacement is such that detachment occurs. This view is supported by certain experimental results linking pulse current level, the effective duration of the pulse (that is to say, the interval from the start of the pulse to the instant that transfer detachment takes place) and the mass of the droplets of transferred material. For example, we have found that for a given electrode material, wire size and shielding gas combination, if the amplitude I of the current pulses is above the minimum current necessary to induce non-gravitational electrode transfer the relationship between the amplitude I of the current pulses and the effective duration T (as defined above) of the pulses is expressed approximately by the equation:

$$I^n = B/T$$

in which B is a coefficient depending on the materials and the size of the drop to be detached and in which the index $n$ normally lies between 1.5 and 2.5. An increase in the size of the droplets, which for a given feed speed of the consumable electrode wire is obtained by decreasing the pulse repeat frequency, is found to require an increase in pulse magnitude or in the effective pulse duration or both, in order to maintain the spray transfer. This result, which we have verified with pulse currents of substantially square waveform to obtain more reliable results in terms of effective magnitude and duration, is contrary to expectations based on a consideration of the static balance. On the basis of a static balance, it would be assumed that at any one pulse current level the conditions and forces acting in the arc would be to some approximation constant and that therefore the detachment of larger drops aided by gravitational forces would have occurred more readily. On the other hand, the increase in pulse magnitude or effective pulse duration for increasing mass of the droplet would not conflict with an explanation which included the force necessary to accelerate the mass of the droplet until detachment occurred, since the inertia of the droplet to be accelerated would act in a sense opposite to its gravitational weight term and would outweigh the latter in the dynamic balance, for accelerations greater than that due to the gravitational force. A further factor supporting this theory is that if the mass of the droplets is allowed to increase, by decreasing the pulse repeat frequency or increasing the electrode feed speed, and the current is adjusted to maintain a fixed effective pulse duration, it is the increase in the square of the current amplitude which varies substantially in proportion to the increase in droplet mass. Also, for a given droplet mass with a given combination of electrode wire and shielding gas atmosphere, the magnitude of the pulse current required for droplet detachment decreases as the time available for detachment is increased. For short detachment times (for example, less than 5 milliseconds), high currents are necessary, while for currents not much in excess of the minimum value for non-gravitational transfer the accelerations are low and the detachment times are long and increase rapidly as this minimum current level is approached.

The realization of the power law relationship between current and duration brings with it a number of advantages. Pulse welding systems generally operate with pulse current derived by rectifying the output of an A.C. source. With such arrangements, each pulse has a maximum duration of one half cycle of the A.C. waveform, which is about ten milliseconds in the case of a 50 c.p.s. supply. In practice, the duration of the pulse is little more than six milliseconds because no current flows until the voltage available exceeds that of the arc. Because of the relatively slow rise and fall times of the pulse due to the sinusoidal wave shape of the supply, the current is greater than a level mid-way between background current and peak pulse current for no more than 5 milliseconds. It happens that the value of five milliseconds occurs at a point on the power law curve linking current amplitude and duration at which increases in duration result in noticeable decreases (due to the power law relationship) in the current amplitude required to achieve pulse-induced spray transfer. Since the current flowing is generally of a comparatively high order, a reduction on this basis is highly advantageous in reducing the demand on the pulse supply equipment. A further advantage is derived from the further discovery that variation of the pulse duration away from that normally used causes a change in the penetration by the transferred droplets into the workpiece. Somewhat surprisingly, high amplitude pulses having correspondingly short effective durations result in considerably less penetration of the workpiece than lower amplitude pulses having correspondingly longer effective durations. This of great advantage in practice, since heretofore it has not been possible to alter by any great extent the penetration associated with any particular mean current level or electrode burn-off rate. As examples, in normal welding operations, deep penetration providing improved wetting of the weld pool deep into the workpiece is desirable, whilst in surfacing and other applications low penetration can be utilised. Typical pulse durations for providing deep penetration for the droplets of the order of twice the wire diameter, for aluminum wire of 1/16th inch diameter, are in the range of 15 to 30 milliseconds. These values are considerably in excess to those used when the pulses were provided by half cycles of the power supply.

To permit these advantages to be obtained, according to the present invention, in addition to a power supply providing an arc-maintaining current and the means for cyclically enhancing the arc current to provide recurring current pulses having a level above the minimum value required for spray transfer, an arc welding apparatus includes a detector for sensing the detachment of a droplet from the control electrode and means responsive to a signal from the detector, indicating that a detachment has taken place, to terminate the current pulse which caused the detachment. This permits the lengthening of the current pulse beyond the usual duration by a simple adjustment of the pulse current amplitude to enable deeper penetration, and has the advantage that a considerable reduction in current may result from the adjustment owing to the power law relationship linking the current amplitude and duration. By such adjustment of amplitude and duration, it can be ensured that the pulse duration does not extend greatly beyond the detachment instant, which would have the additional disadvantage that the continued current at the pulse level would cause too much melting of the consumable electrode and would thus limit the lowest feed speed which could be used. Yet a further advantage is that the automatic termination of the pulse after detachment ensures that "unity correlation" will be maintained, that is to say that each pulse will result in the detachment of only one droplet. A pulse lengthening to achieve increased penetration without decrease in amplitude or with insufficient decrease in amplitude might otherwise result in the detachment of more than one droplet during a pulse period, which is generally found to be undesirable. The pulse termination may take place immediately after detachment or may be delayed until the end of a predetermined period (for example 1–3 milliseconds) following detachment. The detector may take the form of a device sensitive to the arc voltage increase which occurs during the pulse period when a detachment takes place or may be responsive to the rate of change of arc voltage to detect the instant of detachment. In yet a further form, which can be employed in an automatic welding system, the electrode is placed between a light source and a light sensitive cell, the arrangement being such that the droplet, while attached to the electrode, interrupts the light path. On detachment of the droplet, light from the source reaches the light sensitive cell and the resulting change in output signal is used to terminate the welding current pulse. It can be arranged that the next pulse is delayed unil the light path is again interrupted by the formation of a droplet on the end of the advancing electrode wire. This helps to control the arc length, since with a short arc undelayed current pulses would be provided at a preset frequency but, upon lengthening of the arc, pulses would be delayed. This arrangement would be particularly advantageous in the case of the cold start experienced with metal welding with an inert shielding gas, since at the start of such welding, the pulses would be continuous and a high welding current would be available to initiate the process. In a modified system, the droplet may be viewed in flight through the arc and the interruption of the light path to the photo cell used to terminate the welding pulse at a given instant after detachment of the droplets.

Preferably the pulsed current source is arranged to supply arc current having a substantially square waveform, since square pulses are more effective for a greater proportion of the pulse period than sinusoidal pulses, for example.

In order that the invention may be better understood, one example will now be described with reference to the accompanying drawings, in which:

FIGURE 2 is a waveform diagram illustrating the variations of voltage and current during a pulse;

FIGURE 3 is a circuit diagram of the pulse detachment detector;

Figure 1:
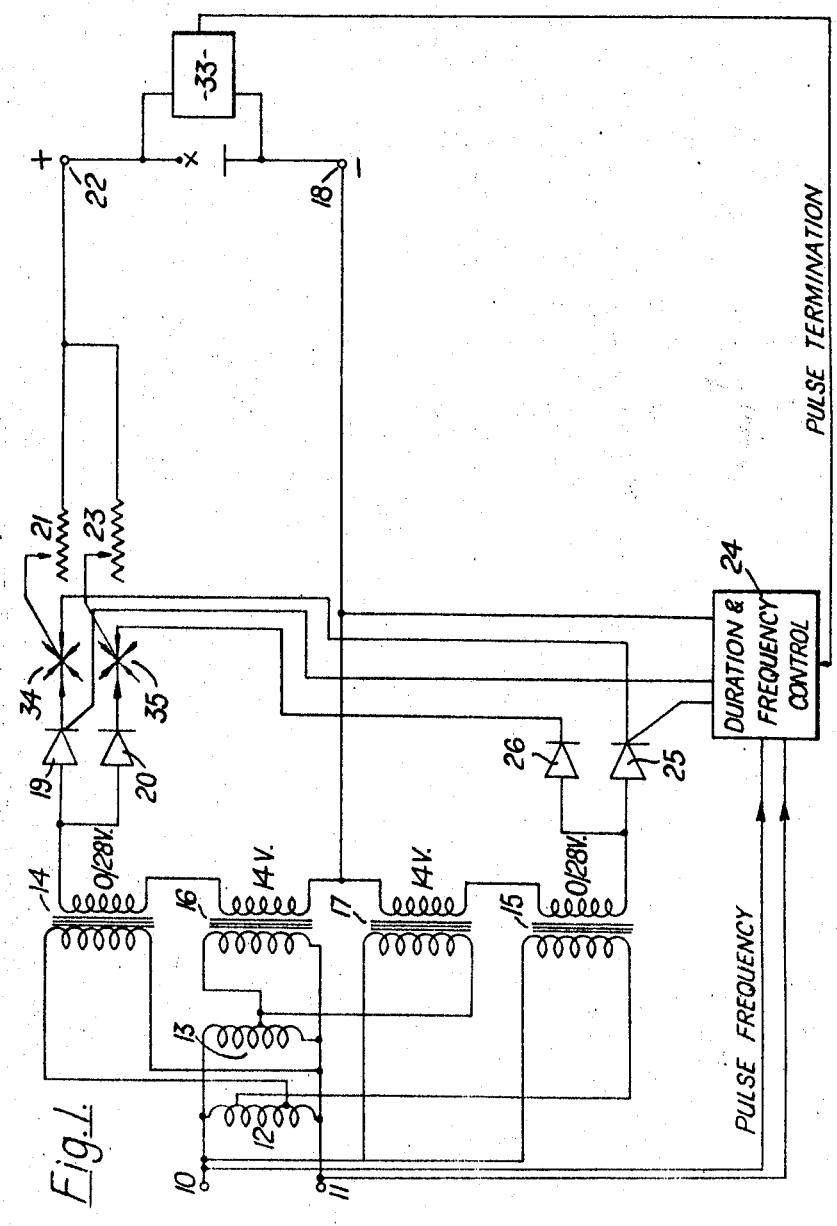
FIGURE 1 is a schematic diagram of one phase of a variable pulse power source.

The basic circuit shown in FIGURE 1 is that for one phase of a three-phase source and is repeated identically for the other two phases of the source to give six phase rectified output.

In FIGURE 1, the line and neutral connections 10 and 11 are connected across the winding 12 of a double variable auto-transformer and across the winding 13 of a further auto-transformer which give fine and coarse control respectively. From the winding 12, a first voltage is tapped for application to the primary of a transformer 14 and a second voltage is derived for application to the primary of a transformer 15. The winding 13 has a single tapping and the primary windings of transformers 16 and 17 can be connected across opposite halves of this winding (as shown) or each connected across the whole of the winding 13. The secondary windings of these transformers are connected in series, the secondary windings of transformers 16 and 17 providing 14 volts each and those of transformers 14 and 15 providing a secondary voltage which can be varied between 0 and 28 volts. A centre tapping of the series-connected secondary windings is taken to the output terminal 18. One end connection of these secondary windings is connected in parallel to the anode of a silicon controlled rectifier 19 and the anode of a diode 20. The silicon controlled rectifier 19 is connected through a rheostat 21 to the output terminal 22, to which the diode 20 is also connected through a rheostat 23.

Conduction in the diode 20 will occur during peak parts of alternate half waves across the transformer secondaries. Conduction in the silicon controlled rectifier 19 depends on whether a gating pulse has been applied to the gate electrode of this controlled rectifier from a duration and frequency control unit 24.

The other end of the series-connected secondary windings is similarly connected to the anodes of a silicon controlled rectifier 25 and diode 26, the cathodes of these components being connected to the same output terminal 22 through the same rheostats 23 and 21 respectively. The same duration and frequency control unit 24 generates gating pulses for application to the gate electrode of silicon controlled rectifier 25.

The diode 26, together with the rectifier 25 if it has received a suitable gating signal, conducts during the half cycle in which the diode 20 and the rectifier 19 are non-conducting. The current passing through the diodes 20 and 26 and the corresponding diodes in the other two phases provides the background current and the current passing through the controlled rectifiers 19 and 25 and these in the other two phases supplies the current pulse. The rectifier cathodes in the other phases are connected to the pulse and background circuits at points 34 and 35 respectively. The background and pulse currents are adjusted by means of the rheostats 23 and 21. Because there are three phases in the complete power supply, the output current has a 300 c./s. ripple.

In order that the waveform of each pulse should be identical in successive cycles, the repeat frequencies of the gating waveforms are preferably chosen in simple relation to the main supply. For example, repeat frequencies of 50, 25, 16⅔, 12½, 8⅓ and 6¼ pulses per second may conveniently be derived. For any given pulse repeat frequency the pulse length can be extended to about 75% of the overall pulse cycle period, when deep penetration is required.

Turning now to FIGURE 2, the waveform 27 shows the current trace during a welding operation using aluminium electrode wire and argon as the shielding gas, the portions 28 representing the background level and the portion 29 the pulse level, the pulse having a duration equal to $t$. The waveform 30 shows the arc voltage trace over the same period. It will be seen that the arc voltage increases from a first level 30 which exists prior to the commencement of the current pulse to a higher level 31 once the pulse has been initiated. When detachment of a droplet occurs there is an upward spike 32 in the voltage trace. It is this upward spike in the voltage which is detected by a sensing unit 33 in FIGURE 1. In response to the detection of such a spike, the sensing unit 33 supplies a control signal to the duration and frequency control unit and this in turn causes termination of conduction in the silicon controlled rectifiers which constitute the pulsing circuit.

The switching off can be virtually immediate following the sensing of the arc voltage disturbance or delayed for a discrete period after the instant of transfer. A delay would permit the droplet to experience the effect of the current pulse after detachment from the electrode wire. For instanc the pulse current (higher level) could be maintained for example, for one or more milliseconds after detachment of a droplet to aid the transfer in flight or even the coalescence of the transferring droplet into the weld pool or the workpiece.

A circuit suitable for use as the sensing unit 33 is shown in FIGURE 3. The terminals 36 and 37 are connected across the arc. The arc voltage signal is applied across a first resistance-capacitance circuit consisting of the resistor R1 and the capacitor C1 which provides self-bias. This circuit has a time constant such that the voltage developed across the capacitor follows the average arc voltage. The arc voltage signal is also applied through a group of series-connected diodes D to a point 38. A resistor R4 is connected between the point 38 and the junction of the resistor R1 and the capacitor C1. The voltage at the point 38 represents the excess of the input voltage over the average voltage determined by R1–C1, after allowance is made for the predetermined minimum introduced by using the diodes D. The voltage at the point 38 is applied to a differentiating network consisting of a resistor R3 and the capacitor C3, which have a time constant of 1 millisecond or less, but not so short that the sharp voltage increases are excessively attenuated. The output of the differentiating circuit constitutes the signal applied to the duration control unit 24 to switch off the gating signal for the silicon controlled rectifiers.

There are other arc voltage fluctuations which could also be detected by such a simple system and which are not necessarily indicative of transfer. For example, if short circuiting occurred (which is generally not desirable) there are major voltage increases from short circuit to arcing voltage levels at the rupture of the short circuit. These can be discriminated against by arranging a pre-biasing voltage to charge the averaging part of the network to 20 volts for example. In addition, a further biasing arrangement could be employed based on relatively long-term average arc voltage with a time constant T2 given by R2 and C2. Thus, with these pre-biasing voltages in the network described above, the sharp voltage increases to be detected must occur at a level in excess of the preset voltage (20 volts) or the long-term average arc voltage (from R2–C2) whichever is the greater. Typical values that can be employed are: for the long-term pre-biasing voltage, a time constant of the order of 0.1 sec., R2 and C2 being 100 ohms and 1,000 µf., respectively; for the average arc voltage network, a time constant of 0.01 sec., R1 and C1 being 100 ohms and 100 µf., respectively; and for the detecting or differentiating network, a time constant of 0.001 sec., C3 and R3 being 0.1 µf. and 10 kΩ. The purpose of the additional bias provided by the diodes D is to discriminate against minor fluctuations in the arc, voltage and against the rise in arc voltage at the beginning of the pulse. If this initial of rise of current is high, then an appreciable upward step appears in the arc voltage which can be detected in the differentiating part of the network. The diodes prevent false output signals by providing sufficient bias between the average arc voltage and the arc voltage step for this change not to appear in the transient detector circuit. Alternatively it could be made impossible to terminate the pulse within 1 millisecond, for example, of the application of the pulse current.

Figure 4:
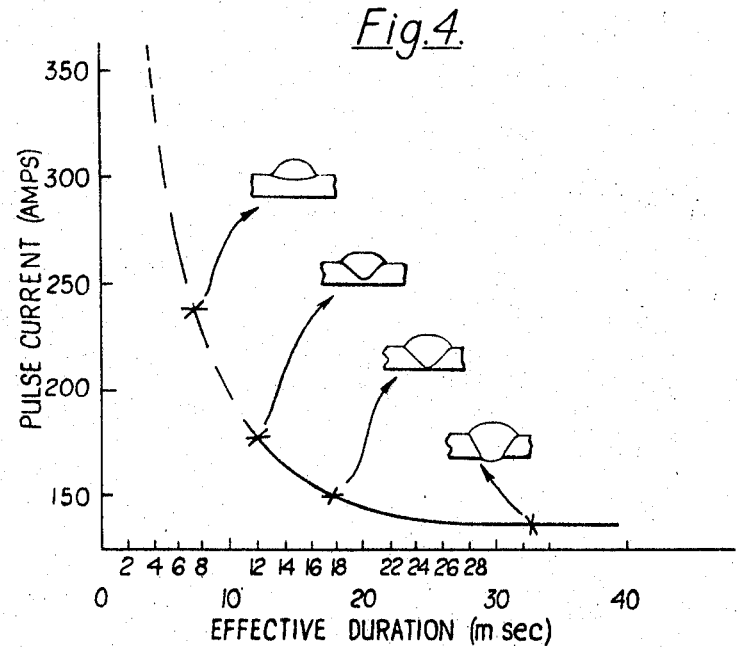
FIGURE 4 is a graph showing the relationship between the current amplitude and pulse duration, and the penetration achieved at various points on the curve.

The effect of lengthening the pulse duration beyond its normal value will be clear from FIGURE 4. This is a graph showing the relationship between pulse current amplitudes and pulse duration, together with illustrations of the penetration achieved for different durations. It will be seen that improved penetration is achieved by increasing the duration beyond the usual value of about 5 milliseconds and that the reduction in current which results in this increase in the period before detachment is a large one, owing to the power law relationship linking amplitude and duration.

Figure 5:
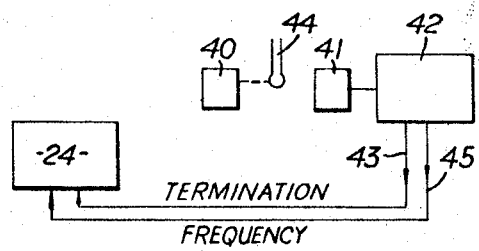
FIGURE 5 shows modifications to FIGURE 1 which are possible when the detector is of the photoelectric kind.

FIGURE 5 shows diagrammatically a system using a photoelectric detector unit. A light source 40 is positioned on one side of the drop and a photo-detector 41 from the other side. An amplifier 42 provides on line 43 an output indicating that light from the source 40 has reached the photo-detector 41 as a consequence of the detachment of a droplet from the electrode wire 44. This signal is used to control the termination of the gating pulse to the silicon controlled rectifiers, as in FIGURE 1. In the example shown in FIGURE 5 however, the amplifier 42 provides a further output signal on line 45 when light from the lamp 40 is again obscured by the end of the electrode wire or the droplet formed thereon, this signal indicating that the system is ready to receive a further pulse of current to detach another droplet from the end of the electrode wire. The signal on line 45 thus constitutes a frequency control signal, initiating conduction in the silicon controlled rectifiers, through the control unit 24, whenever conditions are satisfactory for the detachment of a further droplet on application of a pulse. The advantages of such an arrangement in control of arc length and in cold starting have already been explained.

As an indication of the range of variation desirable, for welding with aluminium wire in argon, the amplitude control for the pulse current should provide for variation over the range from 100 to 600 amps. This will give variation in duration between about 3 milliseconds and 50 milliseconds. Generally speaking, durations of between 10 and 50 milliseconds will be found desirable but for surfacing it may be necessary to reduce the duration well below 10 milliseconds and usually less than 5 milliseconds.

The output slope of the supply is controlled by the rheostat 19, for the pulse current. In general, an output slope between 2 v./100 a. and 5 v./100 a. is found to be convenient for a self-adjusting arc system in which the electrode feed rate is substantially constant.

The power source shown may be modified in many ways, for example, by providing different sources for the background and pulse currents. The use of the same source has the advantage of providing a common open circuit voltage for the two currents.

For the arrangements shown in FIGURE 5, the light source should be brighter than the arc over its spectral range in order to give a clear silhouette of the electrode tip and for this purpose a helium-neon gas laser can be used. The photoelectric system shown is useful when the electrode wire consits of a metal which does not give the upward spike in the voltage waveform, shown in FIGURE 2. As an example, some of the lower grade steels do not necessarily provide a clear upward spike on detachment. For aluminium, copper and stainless steel, the spike in the voltage waveform on detachment is sufficiently clear to be detached by the sensing unit shown in FIGURE 3. When using the optical system, it is not necessary for complete detachment to occur before the termination of the pulse. In other words it does not matter if a signal is sent to the duration control unit while a thin neck of metal still exists between the light source and the photodetector. Once the displacement of the droplet from the main body of wire reaches a predetermined amount, detachment is inevitable.

With the circuit shown in FIGURE 1, the pulse output commences at a point where a given phase and rectifier is about to conduct and is maintained for as many subsequent conducting periods on successive phases as are required. As an example, if the phase circuits giving successive peaks at either polarity are indicated by A, B, C, D, E and F the pulse may be initiated by applying a gating pulse to the silicon controlled rectifier in the circuit A and continued by applying gating pulses to the silicon controlled rectifiers in the circuits B and C. Assuming that the gating pulses then stop, the pulse will have lasted for about 13 milliseconds, on a 50 c.p.s. supply. If the pulse is to be extended further, gating pulses are applied to the silicon controlled rectifiers in circuits D, E, and F. In the resulting overall pulse, the rise and fall times are small compared with the total length of the pulse. If desired, 3-phase bridge can be used, in which one-half of the rectifiers are of the controlled kind.

It may be found that if the output characteristic of the background source droops steeply and the pulse current is low, the total available short circuit current is insufficient to fuse the cold electrode wire rapidly for the initiation of an arc at the start of a run, especially for low pulse repetition frequencies. To overcome this difficulty, an additional power source can be added in parallel to supply the short circuit starting current.

The power source shown can be replaced by a semiconductor power supply circuit comprising a number of individual semi-conductor circuits in parallel; for example 50 circuits each capable of handling 30 amps of short-circuit current from a source having an open circuit voltage of 40 volts. As an example, ADY 26 transistors (manufactured by Mullard Ltd., of London) can be employed.

The operating conditions for these transistors should be such that they are fully on or fully off, to maintain the power dissipation at a low value. Each transistor has its emitter-collector path connected in the power supply circuit with sufficient resistance to limit the current for any individual transistor and to balance the overall current sharing between transistors within the group. The transistors are switched on by the application of simultaneous gating signals to their bases.

I claim:
1. Arc welding apparatus for welding by spray transfer from a consumable electrode to a workpiece, comprising a power supply for supplying an arc-maintaining current to a circuit completed by the workpiece and the consumable electrode, means for cyclically enhancing the arc current to increase the difference between maximum and minimum current levels and to provide a maximum level above the minimum value required for spray transfer, a detector for sensing the detachment of a droplet from the consumable electrode, and means responsive to the detector for terminating the enhancement of the current level in response to the detachment of the droplet.

2. Apparatus in accordance with claim 1, in which the detector includes voltage sensitive means responsive to an increase in arc voltage consequent upon detachment of the droplet to switch the current to its arc-maintaining value.

3. Apparatus in accordance with claim 1, in which the detector includes means sensitive to the increased rate of change of arc voltage upon detachment of a droplet to restore the current to the arc-maintaining value.

4. Apparatus in accordance with claim 1, in which the detector includes a light source and a light-sensitive cell so arranged that light from the source to the cell passes as a consequence of or is interrupted as a consequence of the detachment of a droplet from the consumable electrode.

5. Apparatus in accordance with claim 4, in which the change of light reaching the light sensitive cell as a consequence of the formation of a further droplet on the end of the consumable electrode is used to initiate a further period of enhancement of the arc current level.

6. Arc welding apparatus in accordance with claim 1, substantially as herein described with reference to the accompanying drawings.

References Cited

UNITED STATES PATENTS

| | | | |
|---|---|---|---|
| 2,916,601 | 12/1959 | Lesnewich | 219—131 X |
| 3,071,680 | 1/1963 | Anderson et al. | 219—131 |

RICHARD M. WOOD, *Primary Examiner.*

C. L. ALBRITTON, *Assistant Examiner.*